United States Patent
Bouevitch et al.

(10) Patent No.: US 6,721,477 B2
(45) Date of Patent: Apr. 13, 2004

(54) DISPERSION-FREE OPTICAL FILTERS

(75) Inventors: Oleg Bouevitch, Gloucester (CA); Thomas Ducellier, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 434 days.

(21) Appl. No.: 09/999,911

(22) Filed: May 3, 2001

(65) Prior Publication Data

US 2003/0198437 A1 Oct. 23, 2003

Related U.S. Application Data

(60) Provisional application No. 60/202,077, filed on May 5, 2000.

(51) Int. Cl.[7] .................................................. G02B 6/26
(52) U.S. Cl. .............................. 385/27; 385/15; 359/15; 359/890
(58) Field of Search .............................. 385/15, 27, 39; 359/15, 16, 887, 890

(56) References Cited

U.S. PATENT DOCUMENTS

| | | | | |
|---|---|---|---|---|
| 4,343,969 A | * | 8/1982 | Kellett ........................ | 704/254 |
| 5,216,529 A | * | 6/1993 | Paek et al. ..................... | 359/29 |
| 5,694,233 A | | 12/1997 | Wu et al. ..................... | 359/117 |
| 2003/0161579 A1 | * | 8/2003 | Yan et al. ...................... | 385/37 |

FOREIGN PATENT DOCUMENTS

| EP | 1 136 857 A2 | 9/2001 | ............ G02B/6/34 |
|---|---|---|---|
| JP | 60-428 | * 1/1985 | ............. G02F/2/00 |
| JP | 60-429 | * 1/1985 | ............. G02F/2/00 |

OTHER PUBLICATIONS

Kaname Jinguji et al., "Synthesis of Coherent Two–Port Lattice–Form Optical delay–Line Circuit", Journal of Lightwave Technology, IEEE, New York, vol. 13, No. 1, Jan. 1995, pp. 73–82.

Christian Scheerer, "Phase Distortions in Optical Transmission Systems", Frequenz, Schiele & Schon GmbH, Berlin, DE, vol. 54, No. 1–2, Jan. 2000, pp. 42–46.

* cited by examiner

*Primary Examiner*—John D. Lee
(74) *Attorney, Agent, or Firm*—Teitelbaum & MacLean; Neil Teitelbaum; Doug MacLean

(57) ABSTRACT

The filtering of optical signals, and in particular the interleaving/de-interleaving of optical signals is becoming a necessary step in Dense-Wavelength Division Multiplexing (D-WDM), because of a requirement for smaller channel spacing due to higher levels of traffic. Finite Impulse Response (FIR) filters, including lattice and birefringent waveplate versions, are a particular type of optical filter used for interleaving/de-interleaving optical channels, which can be defined by their transfer function H(f). To ensure dispersion free filtering, the present invention provides a cascaded optical filter, comprising two optical filters, wherein the transfer function of the second filter is the complex conjugate of the first filter, i.e. $H_2(f)=H_1^*(f)$, or the complex conjugate of the first filter $H_1^*(f)$ multiplied by the transfer function of a dispersion free optical filter G(f).

14 Claims, 6 Drawing Sheets

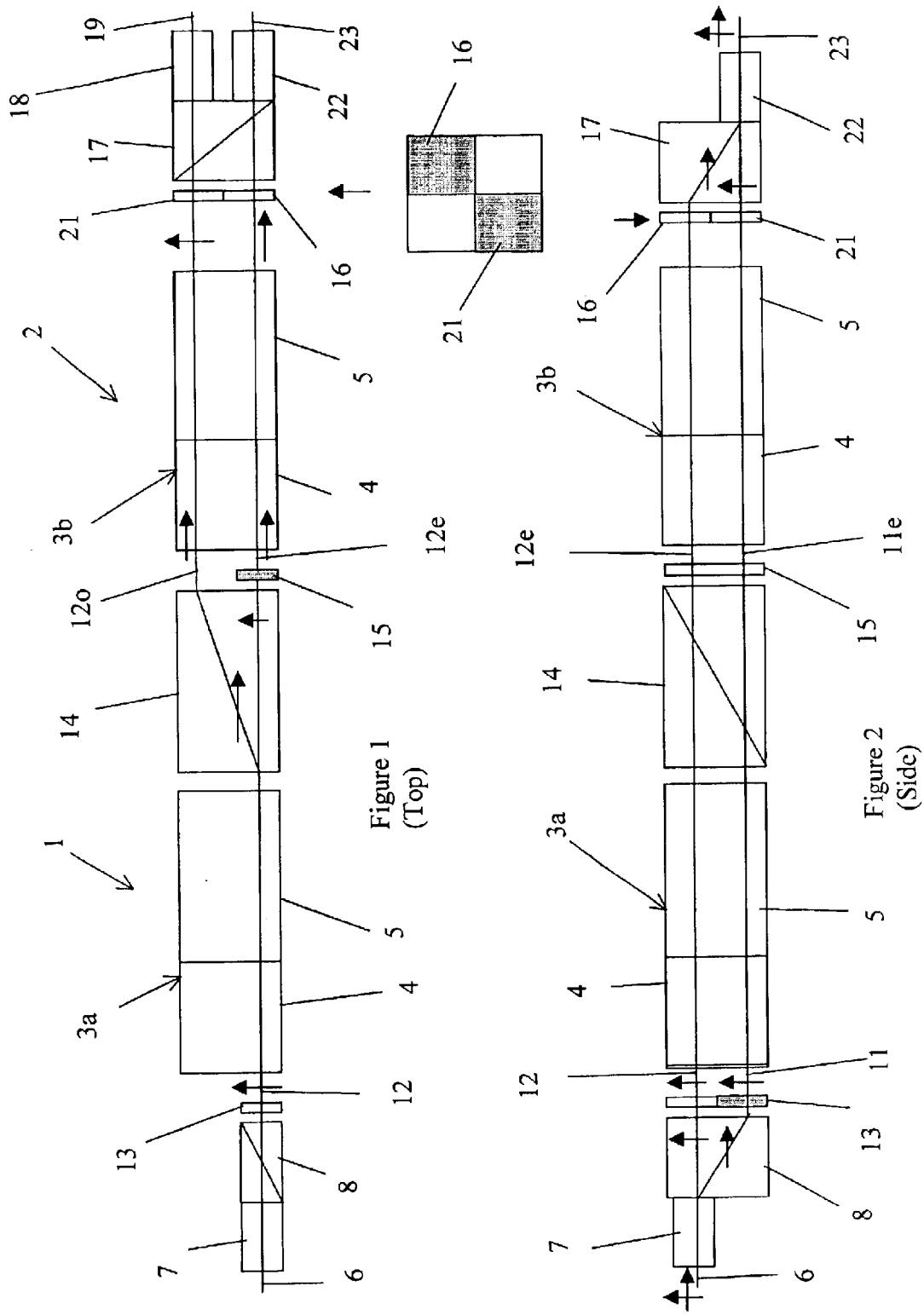

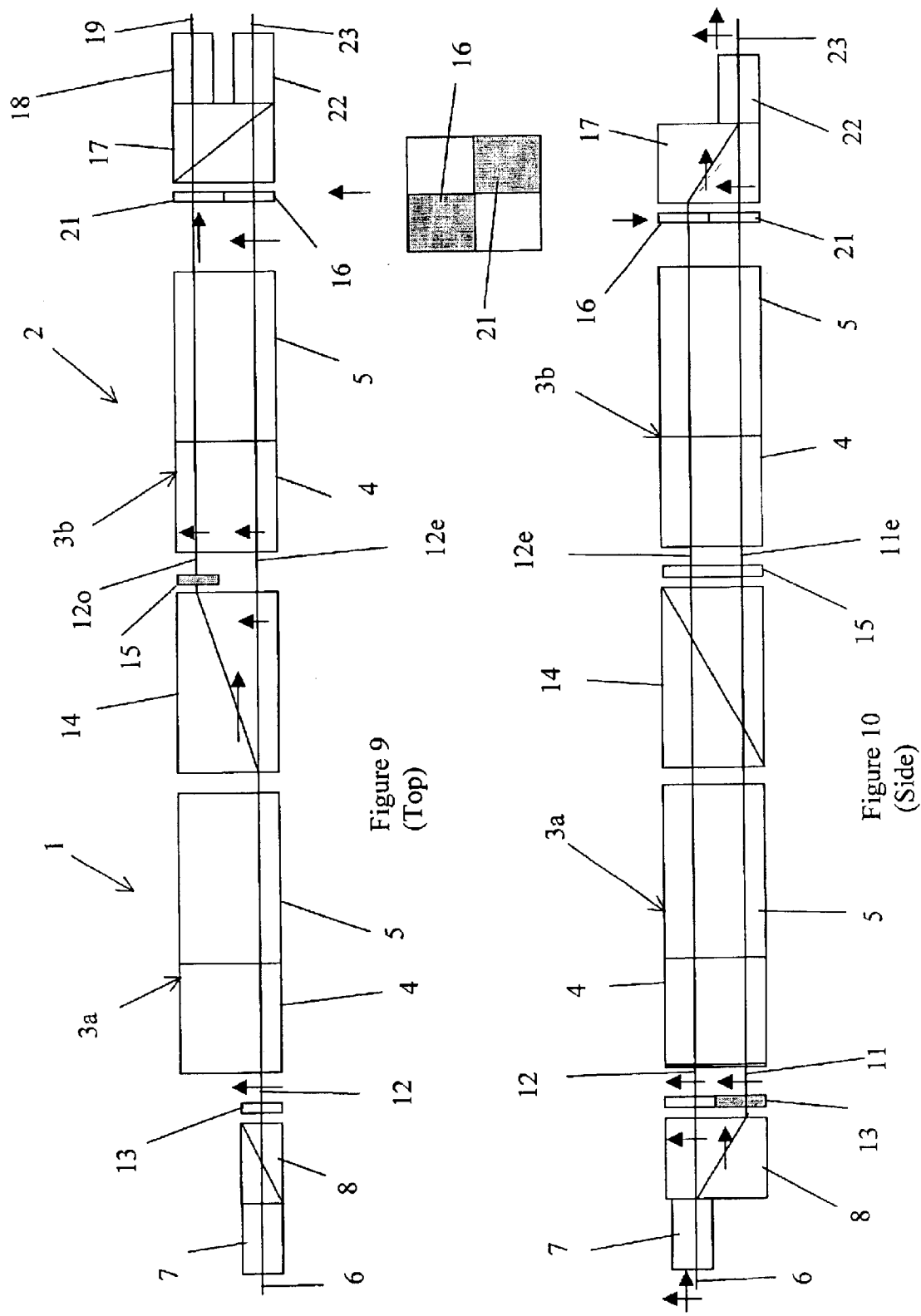
Figure 9 (Top)
Figure 10 (Side)

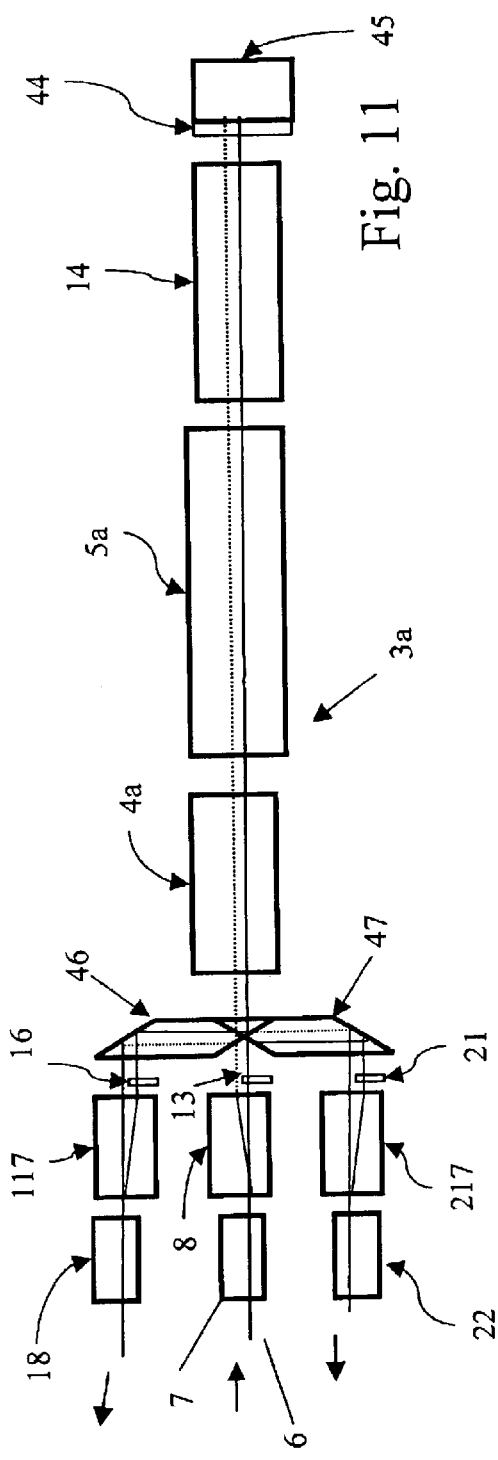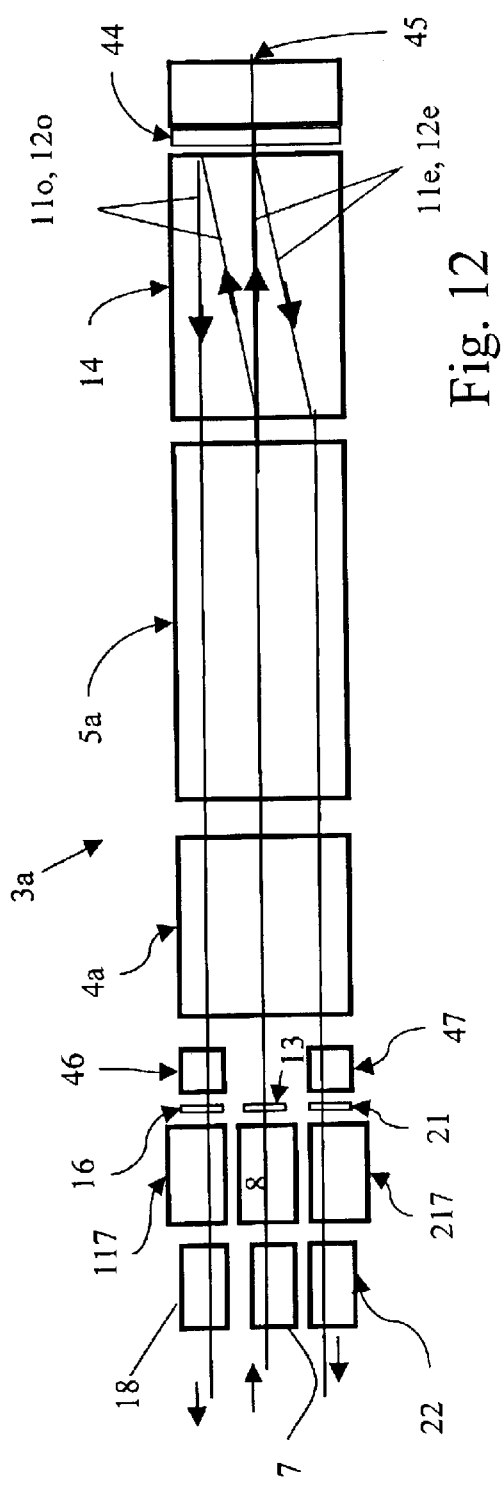

+α_n.e^{niβ.f}

DISPERSION-FREE OPTICAL FILTERS

CROSS-REFERENCE TO RELATED APPLICATIONS

The present invention claims priority from United States Patent Application No. 60/202,077 filed May 5, 2000.

FIELD OF THE INVENTION

The present invention relates to optical filters, and in particular to dispersion-free optical filters for use as interleavers.

BACKGROUND OF THE INVENTION

In dense wavelength division multiplexing (DWDM) optical telecommunications systems, it is advantageous to provide a very narrow width optical filter, which isolates individual transmission channels without distorting the information being transmitted. Accordingly, the optical filter must have a flat-top intensity response and no chromatic dispersion in the pass band. These two conditions guarantee that the filter will not distort the signal either in intensity or in phase.

The first condition, i.e. flat-top intensity response, is well known and has been achieved through various technologies, such as thin film filters, fiber Bragg gratings, coupled resonant cavities, and lattice filters. However, the second condition, i.e. no chromatic dispersion, (or equivalently having a linear phase response in the pass band) is harder to achieve for optical filters, especially when combined with the flat-top requirement. Resonant interleavers have an inherently high dispersion, and any dispersion compensation, which would only be partial, is very difficult to achieve, It is an object of the present invention to disclose practical ways of realizing optical filters with substantially no chromatic dispersion, apart from the material induced dispersion, regardless of the intensity profile of the optical filter. Applications can be envisaged for any type of optical filter, including flat-top filters and interleavers.

SUMMARY OF THE INVENTION

Accordingly the present invention relates to a cascaded optical filter defined by transfer function $H_T(f)$ comprising:
  a first optical filtering means defined by transfer function of $H_1(f)$; and
  a second optical filtering means, optically coupled to the first optical filtering means, defined by transfer function $H_2(f)$;
  wherein the transfer function of the second optical filtering means $H_2(f)$ complex conjugate of the transfer function of the first optical filtering means $H_1^*(f)$;
  whereby $H_T(f)=H_1(f)\times H_2(f)=H_1(f)\times H_1^*(f)$.

BRIEF DESCRIPTION OF THE DRAWINGS

The invention will be described in greater detail with reference to the accompanying drawings, which illustrate preferred embodiments of the invention, wherein:

FIG. 1 is a schematic top view of a cascaded interleaver optical filter according to the present invention;

FIG. 2 is a schematic side view of the filter of FIG. 1;

FIG. 9 is a schematic top view of a cascaded interleaver optical filter according to another embodiment of the present invention, in which an optical signal is passed through two different birefringent stacks with different wave-plate orientations;

FIG. 10 is a schematic side view of the filter of FIG. 9;

FIG. 11 is a schematic top view of a cascaded interleaver optical filter according to another embodiment of the present invention in which the optical signal is reflected back through a single birefringent stack;

FIG. 12 is a schematic side view of the cascaded interleaver optical filter according to FIG. 11;

DETAILED DESCRIPTION

Figure 3:
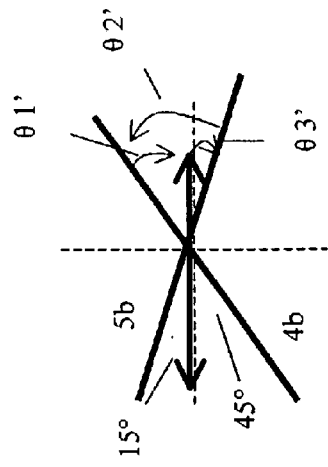
FIGS. 3 and 4 illustrate relative orientations of the two birefringent wave-plates and the optical signal during a first and a second pass, respectively, utilizing the filter of FIGS. 1 and 2.

In order to realize a dispersion free optical filter, two optical filters having respective frequency transfer functions $H_1(f)$ and $H_2(f)$ are cascaded, provided that the transfer function of the second filter is the complex conjugate of the first filter, i.e. $H_1^*(f)$. Alternatively, to provide a larger degree of flexibility in selecting the second filter, the transfer function of the second filter is obtained by multiplying the complex conjugate of the first filter $H_1^*(f)$ by the transfer function of a third dispersion free optical filter G(f). This guarantees that the cascaded filter, which has a transfer function of $H_T(f)=H_1(f)\times H_2(f)=H_1(f)\times H_1^*(f)\times G(f)$, is dispersion free.

A particular type of optical filter, for which the above-mentioned condition can be easily obtained, is called finite impulse response (FIR) optical filter, also referred to as lattice filters for wave-guide embodiments or Solc filters for stacked birefringent wave-plate embodiments.

For this specific type of linear phase filter, the frequency transfer function of the filter can always be described as:

$$H_1(f)=(\alpha_0+\alpha_1.e^{i\beta.f}+\alpha_2.e^{2i\beta.f}+\alpha_3.e^{3i\beta.f}+\ldots+\alpha_n.e^{ni\beta.f}).$$

Where $\alpha_i$, i=1 to n, are related to physical parameters, e.g. coupling ratios in the lattice filters case or wave-plate orientations in Solc filters; and
where $\beta$ is related to a length difference in the lattice filters case or retardation in Solc filters.

To obtain a dispersion free optical filter, one has simply to cascade one optical filter with a frequency transfer function of $H_1(f)$ with a second optical filter having a frequency transfer function of $H_2(f)$, which satisfies the condition stated above. This is true when, for the above example of $H_1(f)$:

$$H_2(f)=(\alpha_n+\alpha_{n-1}.e^{i\beta \cdot f}+\ldots+\alpha_1.e^{(n-1)i\beta \cdot f}+\alpha_0.e^{ni\beta \cdot f}).$$

In this example, the second optical filter, which has the frequency transfer function $H_2(f)$, is constructed using the same physical elements as those used for the first optical filter with the frequency transfer function $H_1(f)$; however, the orientations of wave-plates are changed in a Solc filter embodiment, or the coupling ratios and exchanging arms are changed in a lattice filter case.

An example of a dispersion free optical interleaver using a Solc filter will be described, with reference to FIGS. 1 and 2. This specific example cascades a first optical filter, generally indicated at 1, having frequency transfer functions of $H_1(f)$ with a second optical filter, generally indicated at 2, with a frequency transfer function of $H_2(f)$. Filter 1 includes a birefringent stack 3a, while filter 2 includes a birefringent stack 3b, each birefringent stack being comprised of two wave-plates 4 and 5 having thicknesses L and 2L, respectively, e.g. for $TiO_2$, L=5.62 mm. The wave-plates 4 and 5 are oriented at 45° and 105°, respectively, with respect to the polarization of the incoming beams of light. The thickness L and the orientations of the wave-plates 4 and 5 are chosen to provide a desired FSR, depending on the birefringence of the wave-plate material.

A beam of light, including channels $\lambda_1$ to $\lambda_{11}$, is launched from fiber 6, through collimating lens 7, into a beam splitter 8. The lens 7 is preferably a ¼-pitch GRIN lens, and the beam splitter is preferably a walk-off crystal, e.g. $TiO_2$ or $YVO_4$. In the beam splitter 8, the beam is separated into two orthogonally polarized sub-beams 11 and 12. The state of polarization of one of the sub-beams, sub-beam 11 in the illustrated embodiment, is rotated by 90° in half-wave plate 13, so that both sub-beams have the same polarization for entry into the first birefringent stack 3a. In the illustrated embodiment both sub-beams 11 and 12 are vertically polarized before entering the first birefringent stack 3a. After passing through the first birefringent stack 3a, one set of channels, e.g. the even channels $\lambda_2$, $\lambda_4$, $\lambda_6$ . . . , remains vertically polarized, while the other set of channels, e.g. the odd channels $\lambda_1$, $\lambda_3$, $\lambda_5$ . . . , become horizontally polarized. A second beam splitter 14, e.g. a walk-off crystal or a polarization beam splitter, is used to further sub-divide the sub-beams 11 and 12 into 11o, 11e, 12o and 12e. Half-wave plate 15 is positioned in the path of sub-beams 11e and 12e ensuring that all of the sub-beams 11o, 11e, 12o and 12e enter the second birefringent stack 3b with the same polarization as each other and with a polarization orthogonal to sub-beams 11 and 12 as they entered the first stack 3a. In the illustrated embodiment all of the sub-beams enter the second stack 3b horizontally polarized. Again, when the even channels in sub-beams 11e and 12e exit the second birefringent stack 3b, the polarizations thereof remain the same, i.e. horizontal. Moreover, when the odd channels in sub-beams 11o and 12o exit the birefringent stack 3b, the polarization thereof is rotated by 90°. A half-wave plate 16 is used to rotate the polarization of one of sub-beams 11o or 12o, in this case 12o, so that a beam combiner 17 can bring the two sub-beams together for outputting the odd channels via focusing lens 18 and fiber 19. Similarly, a half-wave plate 21 rotates the polarization of one of sub-beams 11e or 12e, in this case 11e, so that the beam combiner 17 can combine the two sub-beams for outputting the even channels via focusing lens 22 and fiber 23

The illustrated embodiment is shown in operation with vertically polarized sub-beams 11 and 12 as input; however, it would be obvious to adapt the device for any input polarization by rearranging the remainder of the elements accordingly.

To illustrate that the above described cascade filter device is dispersion free, we first define the transfer function of the filter 1 as:

$$H_1(f)=e^{3i\gamma \cdot f}.(\alpha_0+\alpha_1.e^{i\beta \cdot f}+\alpha_2.e^{2i\beta \cdot f}+\alpha_3.e^{3i\beta \cdot f})$$

Where, $\beta=2\pi L\Delta n/c$ $\gamma=2\pi L n_o/c$ $\Delta n=n_e-n_o$ (birefringence of the wave-plate material)

$\alpha_o=\cos\theta 1.\cos\theta 2.\cos\theta 3$ $\alpha_1=-\sin\theta 1.\sin\theta 2.\cos\theta 3$ $\alpha_2=-\cos\theta 1.\sin\theta 2.\sin\theta 3$ $\alpha_3=-\sin\theta 1.\cos\theta 2.\sin\theta 3$ Where:

θ1 is the angle between the polarization of input sub-beams 11 and 12 and the crystal axis of the first wave-plate 4;

θ2 is the angle between that of the first wave-plate 4 and the crystal axis of the second wave-plate 5; and θ3 is the angle between the crystal axis of the second wave-plate 5 and the polarization of the input sub-beams.

In the example shown above, θ1=45°, θ2=60°, θ3=−105°

Accordingly, in order for the cascaded filters 1 and 2 to be dispersion free, the filter 2 must have a frequency transfer function $H_2(f)$ such that $H_2(f)=H_1(f)*\times G(f)$ Therefore, according to the aforementioned example:

$$H_2(f)=(\alpha_3'+\alpha_2'.e^{i\beta \cdot f}+\alpha_1'.e^{2i\beta \cdot f}+\alpha_0'.e^{3i\beta \cdot f})\times G(f)$$

Assuming that the same wave-plate thicknesses are used with different orientations θ1', θ2' and θ3', the following equations are derived:

$\cos\theta 1'.\cos\theta 2'.\cos\theta 3'=-\sin\theta 1.\cos\theta 2.\sin\theta 3$ ($\alpha_0'=\alpha_3$)

$\sin\theta 1'.\sin\theta 2'.\cos\theta 3'=\cos\theta 1.\sin\theta 2.\sin\theta 3$ ($\alpha_1'=\alpha_2$)

$\cos\theta 1'.\sin\theta 2'.\sin\theta 3'=\sin\theta 1.\sin\theta 2.\cos\theta 3$ ($\alpha_2'=\alpha_1$)

$\sin\theta 1'.\cos\theta 2'.\sin\theta 3'=-\cos\theta 1.\cos\theta 2.\cos\theta 3$ ($\alpha_3'=\alpha_0$)

A set of angles satisfying these equations are, for example:

θ1'=−45°, θ2'=60°, θ3'=−15°

Figure 4:
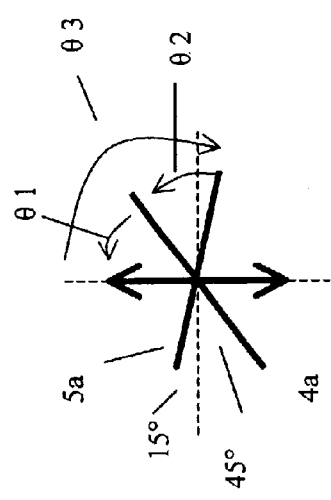

In practice, the elements can be positioned in various arrangements to satisfy this requirement. The simplest arrangement would be to simply rotate the polarization of the beams entering the second filter by 90° so as to be orthogonal to when the original beam entered the first filter. FIGS. 3 and 4 illustrate this example, wherein wave plates 4a and 5a from the first filter 3a have the same orientations as wave plates 4b and 5b from the second filter 3b, while the polarization of the signal, represented by the double-headed arrow, is rotated by 90°. This is the arrangement disclosed in the above-identified embodiment. This arrangement also provides the possibility of passing the beam through the same birefringent stack twice, with a polarization adjustment in between passes, see FIGS. 7 and 8.

Figure 7:
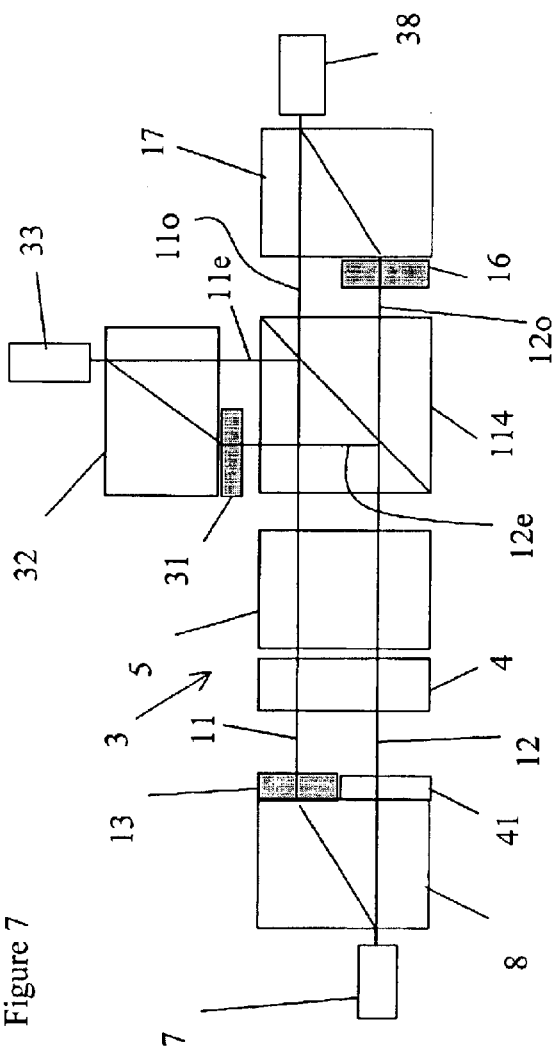
FIG. 7 is a schematic top view of a cascaded interleaver optical filter according to another embodiment of the present invention, in which an optical signal is double passed through a single birefringent stack.
Figure 8:
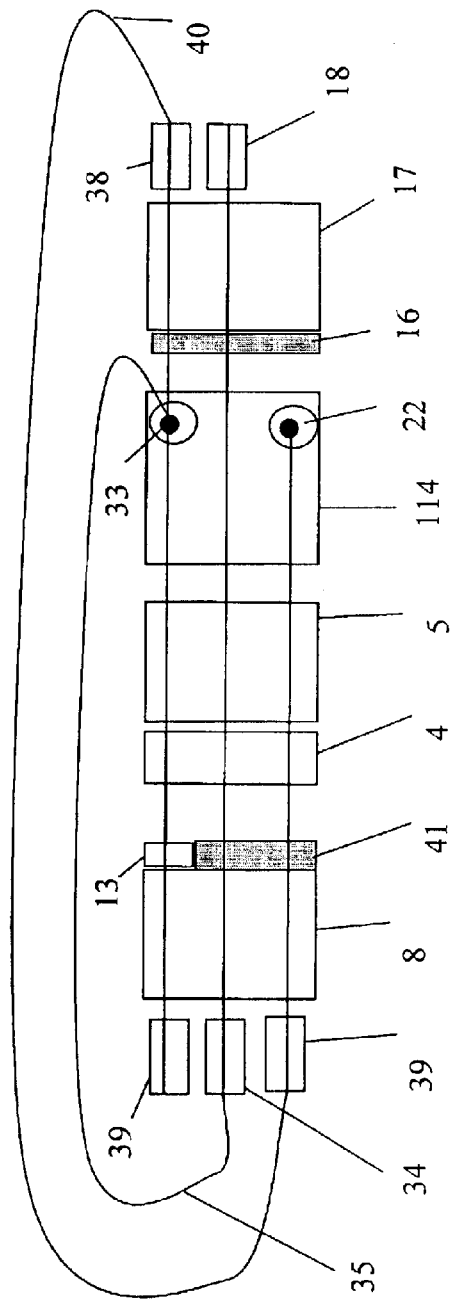
FIG. 8 is a schematic side view of the filter of FIG. 7.

The embodiment illustrated in FIGS. 7 and 8 is similar to the embodiment illustrated in FIGS. 1 and 2, wherein an input beam is launched into port 7, divided into sub-beams 11 and 12 in walk-off crystal 8, directed through birefringent elements 4 and 5, and divided into sub-beams 11o, 11e, 12o and 12e using a polarization beam splitter 114. However, one pair of sub-beams 11e and 12e is combined using half-wave plate 31 and walk-off crystal 32, and transmitted back to the front end of the filter 3 using lenses 33 and 34 and waveguide 35. The other pair of sub-beams 11o and 12o are combined using half-wave plate 16 and walk-off crystal 17, and transmitted to the front end of filter 3 using lenses 38 and 39 and waveguide 40. After the sub-beams representing the even and odd channels are again divided into pairs of orthogonally polarized sub-beams using walk-off crystal 8, half-wave plate 41 is positioned in the path of one of each pair to ensure that the sub-beams enter the wave plates 4 and 5 for a second pass with a polarization orthogonal to the polarization that the sub-beams 11 and 12 had upon entering the wave plates 4 and 5 for the first pass. The odd channel sub-beams pass through the birefringent elements 4 and 5 for a second pass, get recombined by waveplate 16 and beam combiner 17, and are output via lens 18. The even channel sub-beams pass through the birefringent elements 4 and 5 for a second time, get recombined by waveplate 31 and beams combiner 32, and are output via lens 22.

Figure 5:
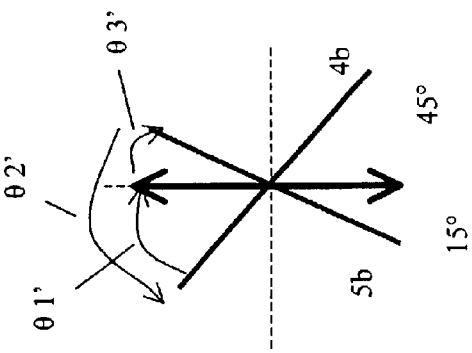
FIGS. 5 and 6 illustrate relative orientations of two birefringent wave-plates and an optical signal during a first and a second pass, respectively, utilizing a filter according to another embodiment of the present invention.
Figure 6:
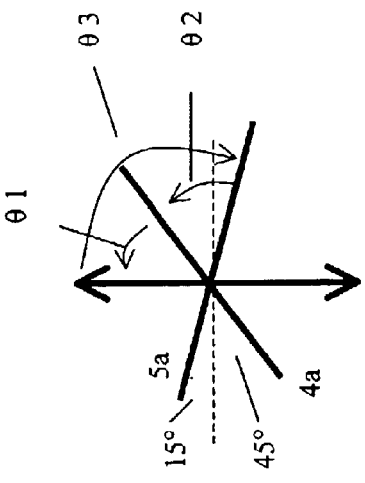

In an alternative embodiment, when the polarization of the beams is the same entering both filters 3a and 3b, the arrangement of the birefringent plates must be altered. FIGS. 5 and 6 illustrate this example, wherein the polarization of the beams remains constant, while the orientations of the wave plates 4b and 5b are different than those of wave plates 4a and 5a, respectively. This embodiment is illustrated in FIGS. 9 and 10, which appear in the side and top views to be identical to FIGS. 1 and 2, except for half-wave plate 15 being positioned in the paths of sub-beams 11o and 12o to ensure that the polarizations of all of the beams entering both stages of the cascaded filter are the same. The important difference in the device illustrated FIGS. 9 and 10, which can be seen in FIGS. 5 and 6, is the different orientations of the crystal axes of the wave plates 4a, 4b, 5a and 5b.

In the embodiment presented above, we have assumed that the sub-beams of light 11 and 12 propagate through the two stacks of wave-plates 3a and 3b in the same order, i.e. first thickness L then second thickness 2L. However, it is possible to go in the opposite order for $H_1(f)$ and for $H_2(f)$, meaning that the first stack is L+2L, whereas the second stack is 2L+L. The conditions are then a little bit different:

cos θ1'.cos θ2'.cos θ3'=−sin θ1.cos θ2.sin θ3 sin θ1'.sin θ2'.cos θ3'=sin θ1.sin θ2.cos θ3 cos θ1'.sin θ2'.sin θ3'=cos θ1.sin θ2.sin θ3 sin θ1'.cos θ2'.sin θ3'=−cos θ1.cos θ2.cos θ3

A set of solutions is, for example:

θ1'=−15 deg.

θ2'=60 deg.

θ3'=−45 deg.

This particular condition enables the invention to be constructed using a single birefringent stack, through which the divided sub-beams are reflected back for a second pass after a 90° rotation, see FIGS. 11 and 12.

With reference to FIGS. 11 and 12, as before, the combined beam is launched from fiber 6 along a first path through lens 7, walk-off crystal 8 and birefringent elements 4a and 5a to polarization beam splitter 14, wherein it is divided into two orthogonally polarized pairs of sub-beams 11o and 12o, and 11e and 12e. In this embodiment, all of the sub-beams pass through quarter wave plate 44, and are reflected by mirror 45. The polarizations of all of the sub-beams is rotated by 90° during two passes through the quarter wave plate 44, whereby one pair of sub-beams 12o and 11o get directed straight back through polarization beam splitter 14 for the second pass through filter 3a along a second path, while the other pair of sub-beams 12e and 11e get walked off even further by polarization beam splitter 14 and directed through filter 3a along a third path. Prismatic walk-off crystals 46 and 47 are used to direct the pairs of sub-beams to their respective combining crystals 117 and 217, respectively, for output via lenses 18 and 22, respectively.

Any optical filter having any desired intensity profile and having no chromatic dispersion can be made using this technique. Indeed, if $|H_T(f)|$ is the desired intensity response, one has to generate $H_1(f)$ such that:

$$|H_1(f)| = \sqrt{|H_T(f)|}$$

This is easy in the case of finite impulse response filter using standard filter generation techniques (Fourier synthesis, for example). $H_2(f)$ is then determined, satisfying the principles of the present invention, to yield the desired result for the cascaded filter $H_2(f).H_1(f)=H_T(f)$ (dispersion free and $|H_T(f)|$ intensity response).

To physically construct $H_1(f)$ and $H_2(f)$ is done by proper choice of coupling ratios and arm lengths (in the case of waveguide lattice filter) or of waveplate orientations and thicknesses (in the case of birefringent Solc filter).

Figure 13:
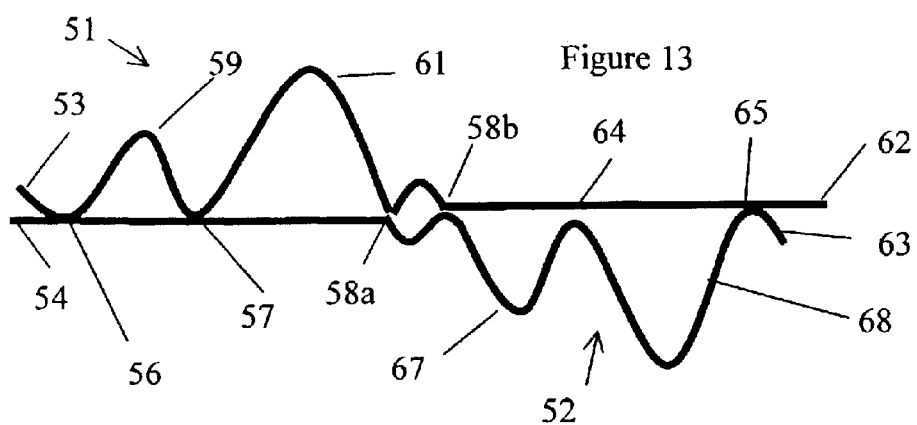
FIG. 13 is a schematic diagram of a dispersion-free lattice-type cascaded optical filter according to another embodiment of the present invention.

With reference to FIG. 13, the present invention is exemplified by a pair of cascaded lattice (or Fourier transform-based) optical filters 51 and 52. The first filter 51 includes a first waveguide 53, a second waveguide 54, and three couplers 56, 57 and 58a. The first waveguide includes a first delay line 59 between the first and second couplers 56 and 57, and a second delay line 61 between the second and third couplers 57 and 58a. The first delay line 59 is ΔL longer than the distance L between couplers 56 and 57 on the second waveguide 54. Similarly, the second delay line 61 is 2ΔL longer than the distance L between couplers 57 and 58 on the second waveguide. Optical fibers and planar waveguides are examples of the different kinds of waveguides that can be used.

The second filter 52 includes a third waveguide 62 extending from the first waveguide, a fourth waveguide 63 extending from the second waveguide, and three couplers 58b, 64 and 65. The fourth waveguide includes a third delay line 67 between couplers 58b and 64, identical to the first delay line 59, and a fourth delay line 68 between couplers 64 and 65, identical to the second delay line 61.

In a conventional Mach-Zender interferometer each coupler has a coupling ratio of 50:50, which would be dispersion free; however according to the present invention the coupling ratios for the various couplers can have almost any value dependent upon the requirements for the output; however, the coupling ratios of the first and fourth couplers 56 and 58b should be substantially the same, while the coupling ratios of the second and fifth couplers 57 and 64, should also be substantially the same. The coupling ratios of the third coupler 58a and the sixth coupler 65 should also be substantially the same. Accordingly, the second optical filter 52 is the inverse of the first optical filer 51. This arrangement results in a symmetric pulse response and, therefore, a dispersion free response. An example of the symmetric pulse response is illustrated in Table 1 below. Using the filter described above, we assume that a single pulse is input into the first filter and that the output of the first filter is four equidistant pulses having an amplitude ratio of 3:4:2:1. If the second filter is the inverse of the first filter, i.e. has an output with an amplitude ratio of 1:2:4:3, then the overall system will have seven pulses with a symmetric amplitude ratio of 3:10:22:30:22:10:3.

TABLE 1

| Amplitude Ratio | Time | | | | | | |
|---|---|---|---|---|---|---|---|
| | 1 | 2 | 3 | 4 | 5 | 6 | 7 |
| 3 | 1 | 2 | 4 | 3 | | | |
| 4 | | 1 | 2 | 4 | 3 | | |
| 2 | | | 1 | 2 | 4 | 3 | |
| 1 | | | | 1 | 2 | 4 | 3 |
| | 3 | 10 | 22 | 30 | 22 | 10 | 3 |

Figure 14:
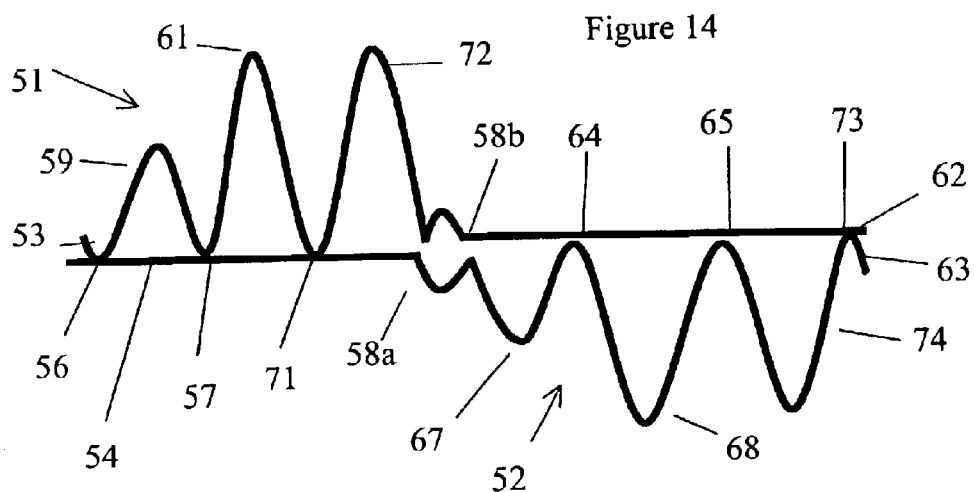
FIG. 14 is a schematic diagram of another embodiment of a dispersion free lattice-type cascaded optical filter of FIG. 13.
Figure 15:
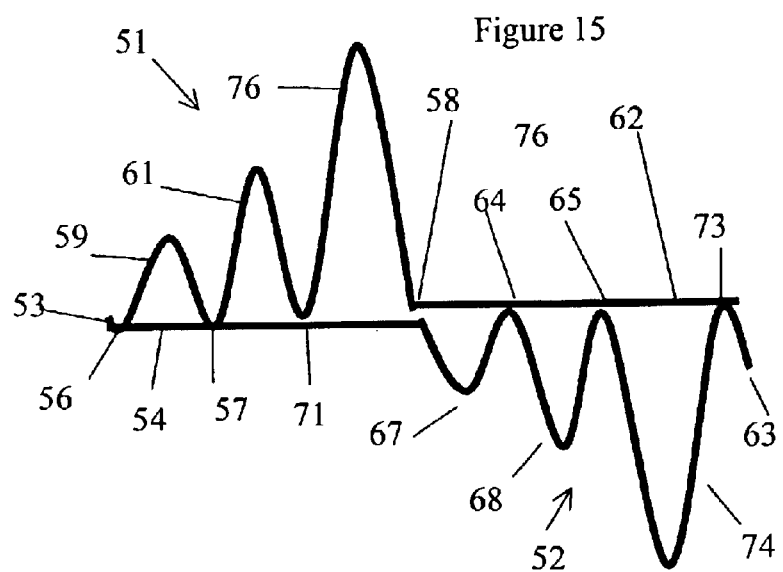
FIG. 15 is a schematic diagram of another embodiment of a dispersion free lattice-type cascaded optical filter of FIG. 13.

It is possible to expand both the first and second filters 51 and 52 to include other delay lines, such as in FIGS. 14 and 15. The first filter 51, in FIG. 14, includes another coupler 71 and an additional delay line 72 of length L+2ΔL. Accordingly, the second filter 52 has another coupler 73, and an inverted delay line 74 of length L+2ΔL corresponding to delay line 72. In this case couplers 56 and 58*b* would have the same coupling ratio, couplers 57 and 64 would have the same coupling ratio, couplers 71 and 65 would have the same coupling ratio, and couplers 58*a* and 73 would have the same coupling ratio. In FIG. 15, the first filter 51 has an additional delay line 76 of length L+4ΔL, while the second filter 52 has a corresponding inverted delay line 77. A single coupler 58 can be used instead of the third and fourth couplers 58*a* and 58*b* (See FIG. 15). If the first and second filters only have two delay lines each, e.g. ΔL and 2ΔL, the first, the third and the sixth couplers 56, 58, 65 would all have the same coupling ratio. However, if the first and second filters have more than two delay lines each, then the single coupler 58 will have no effect on the relationship between the first six couplers. In this case the last coupler of the first filter will be the initial coupler, i.e. the fourth coupler, of the second filter.

This technique enables the realization of optical filters of any arbitrary intensity response, while keeping a linear phase response. In some practical embodiments of those filters, there can still be a little bit of material induced chromatic dispersion left, but it is usually completely negligible compared to the one created by the non-linear phase response of filters by at least two orders of magnitude. Therefore, the chromatic dispersion of the filters generated by this technique is not strictly speaking zero, but very small (limited to that caused by the material dispersion itself).

We claim:

1. A cascaded optical filter defined by transfer function $H_T(f)$ comprising:
   a first optical filtering means defined by transfer function of $H_1(f)$; and
   a second optical filtering means, optically coupled to the first optical filtering means, defined by transfer function $H_2(f)$;
   wherein the transfer function of the second optical filtering means $H_2(f)$ is the complex conjugate of the transfer function of the first optical filtering means $H_1^*(f)$;
   whereby $H_T(f) = H_1(f) \times H_2(f) = H_1(f) \times H_1(f)^*$.

2. The cascaded optical filter according to claim 1, wherein the transfer function of the second optical filtering means $H_2(f)$ is the product of the complex conjugate of the transfer function of the first optical filtering means $H_1^*(f)$ and the transfer function of a third dispersion free optical filter $G(f)$;
   whereby $H_T(f) = H_1(f) \times H_2(f) = H_1(f) \times H_1(f)^* \times G(f)$.

3. The cascaded optical filter according to claim 2, wherein $$H_1(f) = (\alpha_0 + \alpha_1 \cdot e^{i\beta \cdot f} + \alpha_2 \cdot e^{2i\beta \cdot f} + \alpha_3 \cdot e^{3i\beta \cdot f} + \ldots + \alpha_n \cdot e^{ni\beta \cdot f}); \text{ and}$$

$$H_2(f) = (\alpha_n + \alpha_{n-1} \cdot e^{i\beta \cdot f} + \ldots + \alpha_1 \cdot e^{(n-1)i\beta \cdot f} + \alpha_0 \cdot e^{ni\beta \cdot f});$$

wherein $\alpha_{0 \text{ to } n}$ relate to physical parameters selected from the group consisting of coupling ratios in lattice filters, and wave-plate orientations in birefringent filters; and
   wherein β relates to a length difference in a lattice filter or retardation in birefringent filters.

4. The cascaded optical filter according to claim 1, wherein the first optical filtering means comprises a first birefringent element with a thickness L, and a second birefringent element with a thickness of at least L; wherein the second optical filtering means comprises a third birefringent element with a thickness L, and a fourth birefringent element with a thickness of at least L.

5. The cascaded optical filter according to claim 4, further comprising: polarization beam splitting means for dividing the input beam of light into two orthogonally polarized sub-beams after exiting the first optical filtering means; and polarization rotating means for rotating the polarization of at least one of the sub-beams by 90° after exiting the first optical filtering means and before entering the second optical filtering means to ensure both sub-beams enter the second optical filtering means with polarizations orthogonal to the input beam of light entering the first optical filtering means; wherein the crystal axes of the first and second birefringent elements are substantially the same as the crystal axes of the third and fourth birefringent elements, respectively.

6. The cascaded optical filter according to claim 4, further comprising: polarization beam splitting means for dividing the input beam of light into two orthogonally polarized sub-beams after passing through the first optical filtering means; and polarization rotating means for rotating the polarization of at least one of the sub-beams by 90° after exiting the first optical filtering means and before entering the second optical filtering means, whereby the polarization of the input beam of light is the same upon entering both the first and second optical filtering means; and wherein the crystal axes of the first and second birefringent elements are oriented differently than the crystal axes of the third and fourth birefringent elements, respectively.

7. The cascaded optical filter according to claim 1, wherein the first and second optical filtering means include birefringent elements; and wherein the cascaded optical filter further comprises: polarization beam splitting means for dividing the input beam of light into two orthogonally polarized sub-beams after passing through the first optical filtering means from a first end to a second end; and polarization rotating means for adjusting the polarization of at least one of the sub-beams after passing through the first optical filtering means to ensure that the polarization of the sub-beams entering the second optical filtering means is orthogonal to the polarization of the input beam of light entering the first optical filtering means.

8. The cascaded optical filter according to claim 7, wherein the first optical filtering means comprises an optical channel interleaver, through which the input beam of light passes from the first end to the second end; and wherein the second optical filtering means also comprises the optical channel interleaver, through which the sub-beams pass a second time from the first end to the second end.

9. The cascaded optical filter according to claim 7, wherein the first optical filtering means comprises an optical channel interleaver, through which the input beam of light passes from the first end to the second end; and wherein the second optical filtering means also comprises the optical channel interleaver, through which the sub-beams pass a second time from the second end to the first end.

10. The cascaded optical filter according to claim 1, wherein the first optical filtering means comprises a first birefringent element with a thickness L, and a second birefringent element with a thickness 2L; wherein $$H_1(f)=e^{3i\gamma \cdot f}\cdot(\alpha_0+\alpha_1\cdot e^{i\beta \cdot f}+\alpha_2\cdot e^{2i\beta \cdot f}+\alpha_3\cdot e^{3i\beta \cdot f});$$

in which:

$\beta=2\pi L\Delta n/c$, $\gamma 2\pi L n_o/c$;

$\Delta n=n_e-n_o$ (birefringence along an extraordinary axis of the birefringent elements—birefringence along an ordinary axis of the birefringent elements);

$\alpha_o=\cos \theta 1.\cos \theta 2.\cos \theta 3$;

$\alpha_1=-\sin \theta 1.\sin \theta 2.\cos \theta 3$;

$\alpha_2=-\cos \theta 1.\sin \theta 2.\sin \theta 3$;

$\alpha_3=-\sin \theta 1.\cos \theta 2.\sin \theta 3$;

θ1 is an angle between a polarization of an input beam of light and a crystal axis of the first birefringent element;

θ2 is an angle between that of the first birefringent element and a crystal axis of the second birefringent element; and θ3 is an angle between the crystal axis of the second birefringent element and the polarization of the input beam of light;

wherein the second optical filtering means comprises a third birefringent element with a thickness L, and a fourth birefringent element with a thickness 2L; wherein $$H_2(f)=(\alpha_3'+\alpha_2'\cdot e^{i\beta \cdot f}+\alpha_1'\cdot e^{2i\beta \cdot f}+\alpha_0'\cdot e^{3i\beta \cdot f})$$

in which:

$\alpha_o'=\cos \theta 1'.\cos \theta 2'.\cos \theta 3'$;

$\alpha_1'=-\sin \theta 1'.\sin \theta 2'.\cos\theta 3'$;

$\alpha_2'=-\cos \theta 1'.\sin \theta 2'.\sin \theta 3'$;

$\alpha_3'=-\sin \theta 1'.\cos \theta 2'.\sin \theta 3'$;

θ1' is an angle between a crystal axis of the third birefringent element and a polarization of an input beam of light;

θ2' is an angle between a crystal axis of the fourth birefringent element and that of the third birefringent element; and θ3' is an angle between a polarization of the input beam of light and the crystal axis of the fourth birefringent element;

whereby:

$\alpha_o'=\cos \theta 1'.\cos \theta 2'.\cos \theta 3'=\alpha_3=-\sin \theta 1.\cos \theta 2.\sin \theta 3$;

$\alpha_1'=-\sin \theta 1'.\sin \theta 2'.\cos \theta 3'=\alpha_2=-\cos \theta 1.\sin \theta 2.\cos \theta 3$;

$\alpha_2'=-\cos \theta 1'.\sin \theta 2'.\sin \theta 3'=\alpha_1=-\sin \theta 1.\sin \theta 2.\cos \theta 3$; and $\alpha_3'=-\sin \theta 1'.\cos \theta 2'.\sin \theta 3'=\alpha_o=\cos \theta 1.\cos \theta 2.\cos \theta 3$.

11. The cascaded optical filter according to claim 10, wherein θ1=45°, θ2=60°, θ3=−105°; and wherein θ1'=−45°, θ2'=60°, θ3'=−15°.

12. The cascaded optical filter according to claim 1, wherein the first and the second optical filtering means are lattice filters having a plurality of couplers; wherein at least two of the couplers have different coupling ratios.

13. The cascaded optical filter according to claim 12, wherein the second optical filtering means is the inverse of the first optical filtering means.

14. The cascaded optical filter according to claim 12, wherein the first optical filtering means comprises:
a first waveguide;
a second waveguide; and
a first, a second and a third coupler;
wherein the first waveguide includes a first delay line having a first length between the first and second couplers, and a second delay line having a second length between the second and third couplers;
wherein the second optical filtering means comprises:
a third waveguide extending from the first waveguide;
a fourth waveguide extending from the second waveguide,
a fourth, a fifth and a sixth coupler;
wherein the fourth waveguide includes a third delay line having the first length between the fourth and fifth couplers, and a fourth delay line having the second length between the fifth and sixth coupler;
wherein the first length or the second length is a multiple of the other;
wherein the first and fourth couplers have substantially the same coupling ratio;
wherein the second and fifth couplers have substantially the same coupling ratio; and
wherein the third and sixth couplers have substantially the same coupling ratio.

* * * * *

UNITED STATES PATENT AND TRADEMARK OFFICE
CERTIFICATE OF CORRECTION

PATENT NO. : 6,721,477 B2
DATED : April 13, 2004
INVENTOR(S) : Bouevitch et al.

It is certified that error appears in the above-identified patent and that said Letters Patent is hereby corrected as shown below:

Column 3,
Line 24, "channels $\lambda_1$ to $\lambda_{11}$," should read -- channels $\lambda_1$ to $\lambda_n$, --

Column 4,
Line 10, "$\Delta n = n_c - n_o$" should read -- $\Delta n = n_e - n_o$ --

Column 7,
Line 64, "filtering means $H_1^*(t)$" should read -- filtering means $H_1^*(f)$ --

Column 9,
Line 15, "$\beta = 2\pi\Delta L\Delta n/c$, $\gamma 2\pi L n_o/c$;" should read -- $\beta = 2\pi L\Delta n/c$, $\gamma 2\pi L n_o/c$; --

Column 10,
Line 7, "$\alpha_1' = -\sin\theta 1'.\sin\theta 2'.\cos\theta 3' = \alpha_2 = -\cos\theta 1.\sin\theta 2.\cos\theta 3$;" should read -- $\alpha_1' = -\sin\theta 1'.\sin\theta 2'.\cos\theta 3' = \alpha_2 = -\cos\theta 1.\sin\theta 2.\sin\theta 3$; --

Signed and Sealed this

Eighteenth Day of January, 2005

JON W. DUDAS
*Director of the United States Patent and Trademark Office*